United States Patent
Suraparaju (10) Patent No.: US 11,140,148 B1
(45) Date of Patent: Oct. 5, 2021

(54) METHOD AND SYSTEM FOR INSTANT SINGLE SIGN-ON WORKFLOWS

(71) Applicant: Konica Minolta Business Solutions U.S.A., Inc., Ramsey, NJ (US)

(72) Inventor: Rahul Suraparaju, Fremont, CA (US)

(73) Assignee: Konica Minolta Business Solution U.S.A., Inc., Ramsey, NJ (US)

( * ) Notice: Subject to any disclaimer, the term of this patent is extended or adjusted under 35 U.S.C. 154(b) by 0 days.

(21) Appl. No.: 16/834,599

(22) Filed: Mar. 30, 2020

(51) Int. Cl.
| | |
|---|---|
| H04L 29/06 | (2006.01) |
| H04L 29/08 | (2006.01) |
| G06F 3/0481 | (2013.01) |
| G06F 3/0488 | (2013.01) |
| G06F 21/41 | (2013.01) |

(52) U.S. Cl.
CPC ........ *H04L 63/0815* (2013.01); *G06F 3/0488* (2013.01); *G06F 3/04817* (2013.01); *G06F 21/41* (2013.01); *H04L 63/083* (2013.01); *H04L 63/0861* (2013.01); *H04L 63/10* (2013.01); *H04L 67/02* (2013.01); *H04L 67/10* (2013.01); *H04L 67/141* (2013.01); *H04L 67/2838* (2013.01)

(58) Field of Classification Search
None
See application file for complete search history.

(56) References Cited

U.S. PATENT DOCUMENTS

| | | | | |
|---|---|---|---|---|
| 5,818,936 A | * | 10/1998 | Mashayekhi | ....... H04L 63/0815 713/167 |
| 5,892,828 A | * | 4/1999 | Perlman | .................. G06F 21/41 713/183 |
| 9,197,623 B2 | * | 11/2015 | Srinivasan | .......... H04L 63/0853 |
| 9,386,120 B2 | * | 7/2016 | Borzycki | ................ G06F 21/41 |
| 9,407,628 B2 | * | 8/2016 | Sondhi | .................. H04L 63/102 |
| 9,548,976 B2 | * | 1/2017 | Belote | ................. H04L 63/0815 |
| 10,097,533 B2 | * | 10/2018 | Child | ....................... G06F 21/41 |
| 10,470,040 B2 | * | 11/2019 | Belote | ................... H04W 12/06 |
| 10,484,358 B2 | * | 11/2019 | Venkata | .............. H04L 63/0815 |
| 10,778,684 B2 | * | 9/2020 | Gupta | ................. H04L 63/0815 |
| 10,846,390 B2 | * | 11/2020 | Subramanian | .......... G06F 21/41 |
| 2007/0198435 A1 | * | 8/2007 | Siegal | .................. G06Q 20/382 705/67 |

(Continued)

Primary Examiner — Lashonda T Jacobs
(74) Attorney, Agent, or Firm — Buchanan Ingersoll & Rooney PC (57) ABSTRACT

A method, a non-transitory computer readable medium, and a system are disclosed for a single sign-on for services. The method includes: receiving, on a computer processor, user identification captured by a biometric device of a user; forwarding, by the computer processor, the user identification to an authentication server; receiving, on the computer processor, a user JSON Web Token (user-JWT), user principle name, active directory domain name, and user domain name password, upon authentication of the user by the authentication server; performing, by the computer processor, an active directory join operation with an active directory using the user principle name, the active directory domain name, and the user domain name password; launching, on the computer processor, a browser that communicates with the authentication server; and receiving, on the computer processor, an HTML page constructed with JavaScript code with clickable icons for provisioned services from the authentication server.

20 Claims, 6 Drawing Sheets

(56) References Cited

U.S. PATENT DOCUMENTS

| | | | |
|---|---|---|---|
| 2012/0023556 A1* | 1/2012 | Schultz | G06F 21/41 726/4 |
| 2013/0007868 A1* | 1/2013 | Hoggan | H04L 9/3263 726/8 |
| 2013/0262155 A1* | 10/2013 | Hinkamp | G16H 10/60 705/4 |
| 2015/0089579 A1* | 3/2015 | Manza | H04L 63/20 726/1 |
| 2015/0149565 A1* | 5/2015 | Ahmed | H04L 51/04 709/206 |
| 2015/0244705 A1* | 8/2015 | Flamini | H04L 29/08702 726/8 |
| 2018/0131685 A1* | 5/2018 | Sridhar | H04L 67/02 |
| 2018/0270220 A1* | 9/2018 | Jensen | H04L 63/0815 |
| 2018/0316657 A1* | 11/2018 | Hardt | H04L 67/06 |
| 2018/0351944 A1* | 12/2018 | Cho | H04L 9/3271 |
| 2019/0392659 A1* | 12/2019 | Seenivasagam | H04L 9/0894 |
| 2020/0213297 A1* | 7/2020 | Suraparaju | H04L 63/0876 |
| 2021/0126910 A1* | 4/2021 | Chauhan | H04L 63/0815 |

\* cited by examiner

METHOD AND SYSTEM FOR INSTANT SINGLE SIGN-ON WORKFLOWS

FIELD OF THE INVENTION

The present disclosure generally relates to methods and systems for instant single sign-on workflows, and more particularly, methods and systems for instant single sign-on for clinical and pharmaceutical (i.e., pharma) workflows for on-premises and cloud services and applications.

BACKGROUND OF THE INVENTION

Single sign-on (SSO) is an authentication process that allows a user to access multiple applications with one set of login credentials. Single sign-on, for example, is a common procedure in enterprises, where a client accesses multiple resources connected to a local area network (LAN).

Clinical workflows that are exercised by healthcare providers demand speed due to the nature of workflow itself. For example, a patient visits provider's office, a nurse initially signs into a system and accesses the patient record, enter some details, logs-out and the doctor starts the examination and logs in to access the patient record, etc., and so and so on until care with patient is done for that appointment.

During this workflow which is centered on the same patient, there are a lot of logins and logouts happening across several health care professions of different kind. Across these provider switches, each provider during his/her secure logon session, he/she ends up using several on-premises services and/or applications and cloud based services and/or applications. Similar experience can hold true, for example, for Pharma verticals.

In the clinical work flows, providers currently (for example, nurses and doctors) after authenticating, end up mouse-clicking or hitting keyboard buttons to access on-premises (i.e., on-prem) and cloud based single sign-on services and/or applications. Due to the demanding nature of the workflow, this is not very efficient and productive. Each provider/nurse/specialist (i.e. healthcare professional) clicking and pressing keys when accessing these services and applications takes a lot of time and when combined together, during an entirety of a patient's time at appointment can result in the waste of time and money.

SUMMARY OF THE INVENTION

In consideration of the above issues, it would be desirable to have a workflow that automates the whole process in such a way, for example, that healthcare professional, experience no-click access to on-premises and cloud services and applications.

In accordance with an aspect, a method for a single sign-on for services, the method comprising: receiving, on a computer processor, user identification captured by a biometric device of a user; forwarding, by the computer processor, the user identification to an authentication server; receiving, on the computer processor, a user JSON Web Token (user-JWT), user principle name, active directory domain name, and user domain name password, upon authentication of the user by the authentication server; performing, by the computer processor, an active directory join operation with an active directory using the user principle name, the active directory domain name, and the user domain name password; launching, on the computer processor, a browser that communicates with the authentication server; and receiving, on the computer processor, an HTML page constructed with JavaScript code with clickable icons for provisioned services from the authentication server, the provisioned services being on-premises services and cloud services.

In accordance with another aspect, a non-transitory computer readable medium storing computer readable program code executed by a processor for a single sign-on for services is disclosed, the process comprising: receiving user identification captured by a biometric device of a user; forwarding the user identification to an authentication server; receiving a user JSON Web Token (user-JWT), user principle name, active directory domain name, and user domain name password, upon authentication of the user by the authentication server; performing an active directory join operation with an active directory using the user principle name, the active directory domain name, and the user domain name password; launching a browser that communicates with the authentication server; and receiving an HTML page constructed with JavaScript code with clickable icons for provisioned services from the authentication server, the provisioned services being on-premises services and cloud services.

In accordance with another aspect, a system is disclosed for a single sign-on for services, the system comprising: an authentication client having a processor, the processor configured to: receive user identification captured by a biometric device of a user; forward the user identification to an authentication server; receive a user JSON Web Token (user-JWT), user principle name, active directory domain name, and user domain name password, upon authentication of the user by the authentication server; perform an active directory join operation with an active directory using the user principle name, the active directory domain name, and the user domain name password; launch a browser that communicates with the authentication server; and receive an HTML page constructed with JavaScript code with clickable icons for provisioned services from the authentication server, the provisioned services being on-premises services and cloud services.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Reference will now be made in detail to the present preferred embodiments of the invention, examples of which are illustrated in the accompanying drawings. Wherever possible, the same reference numbers are used in the drawings and the description to refer to the same or like parts.

Figure 1:
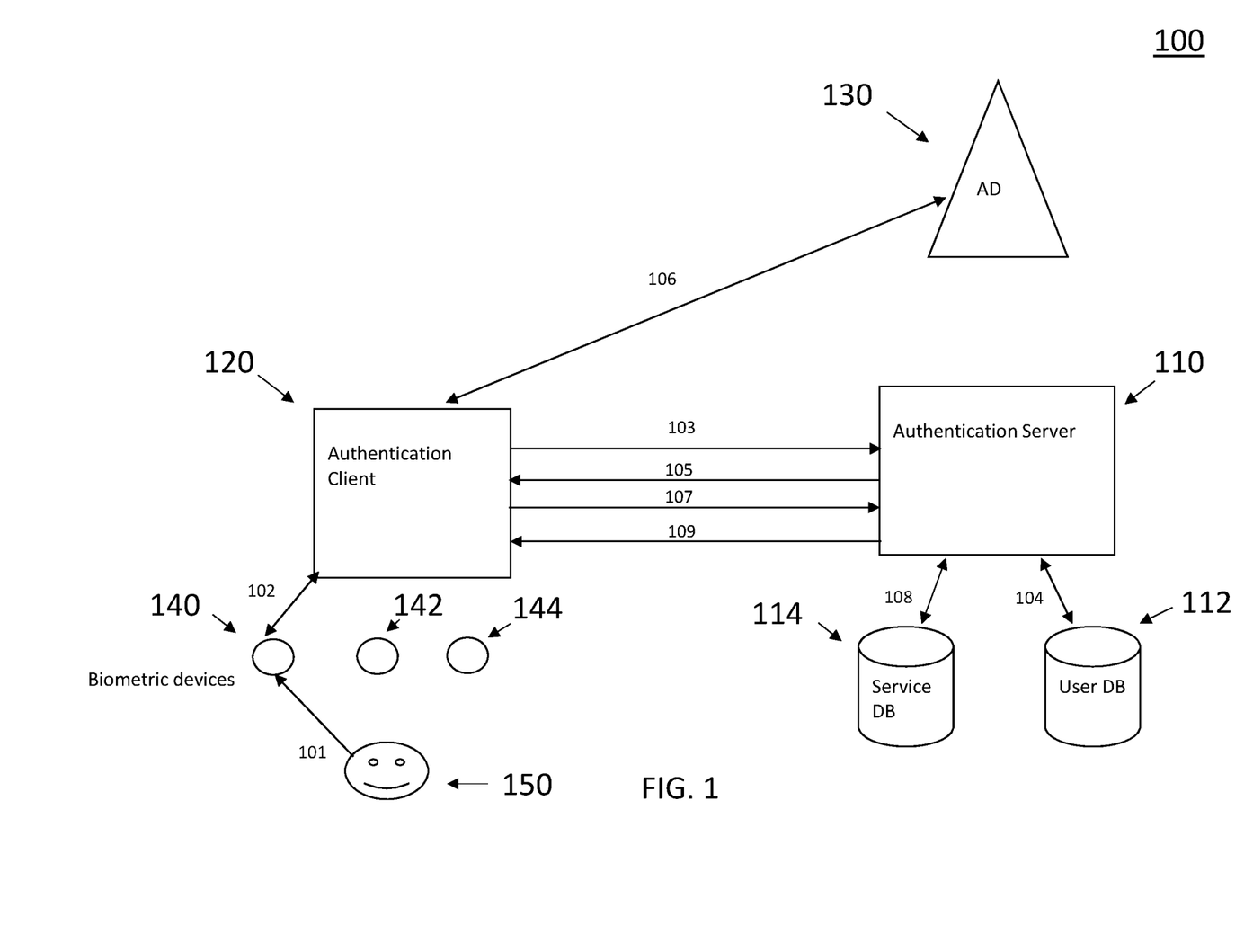
FIG. 1 is an illustration of a system for single sign-on workflow in accordance with an exemplary embodiment.

FIG. 1 is an illustration of an authentication system 100 for single sign-on workflows, for example, for clinical and pharmaceutical workflows, in accordance with an exemplary embodiment. As shown in FIG. 1, the system 100 includes an authentication server 110, an authentication client 120, an active directory, one or biometric devices 140, 142, 144, and one or more users 150. In addition, the authentication server 110 can including a user database 112 and a service database (i.e., on-premises server) 114.

In accordance with an exemplary embodiment, the authentication can provide instantaneous single sign-on upon a successful authentication via, for example, a biometric gesture with a biometric device 140, 142, 144, (for example, a tap on the biometric device 140, 142, 144, with near-field communication (NFC), enter a finger print on the biometric device 140, 142, 144, etc.), and which does not require a user 150 to perform any additional steps via, for example, a cloud and/or an on-premises experience for receipt of cloud services or on-premises services.

In accordance with an exemplary embodiment, in step 101, a user 150, for example, a health care profession performs biometric authentication on a biometric device 140, 142, 144. The biometric device 140, 142, 144 being configured to verify or recognize the identity of the user 150 based on a physiological or behavioral characteristic as disclosed herein, for example, a Nymi™ band. In a step 102, the physiological or behavioral characteristics of the user 150 are captured by the authentication client 120 to perform user identification. In step 103, the authentication client 120 performs user authentication with an authentication server 110. In step 104, the authentication server 110 fetches (i.e., retrieves) details on the user 150 from a user database (User DB) 112. In accordance with an exemplary embodiment, the biometric device 140, 142, 144 and the user 150 have previously been registered with the authentication server 110 and the user database 112. Upon successful authentication of the user 150, in step 105, the authentication server 110 provides a user Jason Web Token (user-JWT) for the user 150 to the authentication client 120 with a user principle name, active direction (AD) domain name, and user domain password. In step 106, the authentication client stores the user-JWT, and performs an AD-join operation using the user principle name, AD domain name, and user domain password retrieved from the authentication server. In step 107, the authentication client 120 launches a browser that instantly talks to the authentication server (i.e., https://<servers domain name>/../../captivecloud?userJWT=<userjwt>/).

In a step 108, the authentication server 110 validates the user-JWT, and fetches (retrieves) provisioned cloud and on-premises services for the authenticated user, for example, from a service database (Service DB) 114. In accordance with an exemplary embodiment, the on-premises services can be hosted in the service database 114. In step 109, the authentication server 110 responds to the authentication client 120 with an HTML page that is constructed, for example, with Java Script code with clickable icons for each of the provisioned services (i.e., on-premises services and/or cloud services).

In accordance with an exemplary embodiment, the HTML page is then presented to the user 150, for example, via a graphical user interface on the authentication client 120 for use (i.e., service consumption) by the user(s) 150, and wherein the consumption can be started, for example, when the user 150 initiates a mouse-click, strikes or hits a key on keyboard on the authentication client 120, or touch of the graphical user interface.

In accordance with an exemplary embodiment, the authentication client 120, can be for example, smartphones, tablet computer, laptops, or desktop computers. As set forth above, the user 150 is now on the active directory (AD) 130 domain and at this point, a process for captive cloud and captive-on-premises starts, which can include a software agent at the authentication client 120 that is launched via a default browser session, for example, Chrome or Firefox, i.e., the session is with authentication server 110: https://<servers domain name>/../../captivecloud?userJWT=<userjwt>/.

Figure 2:
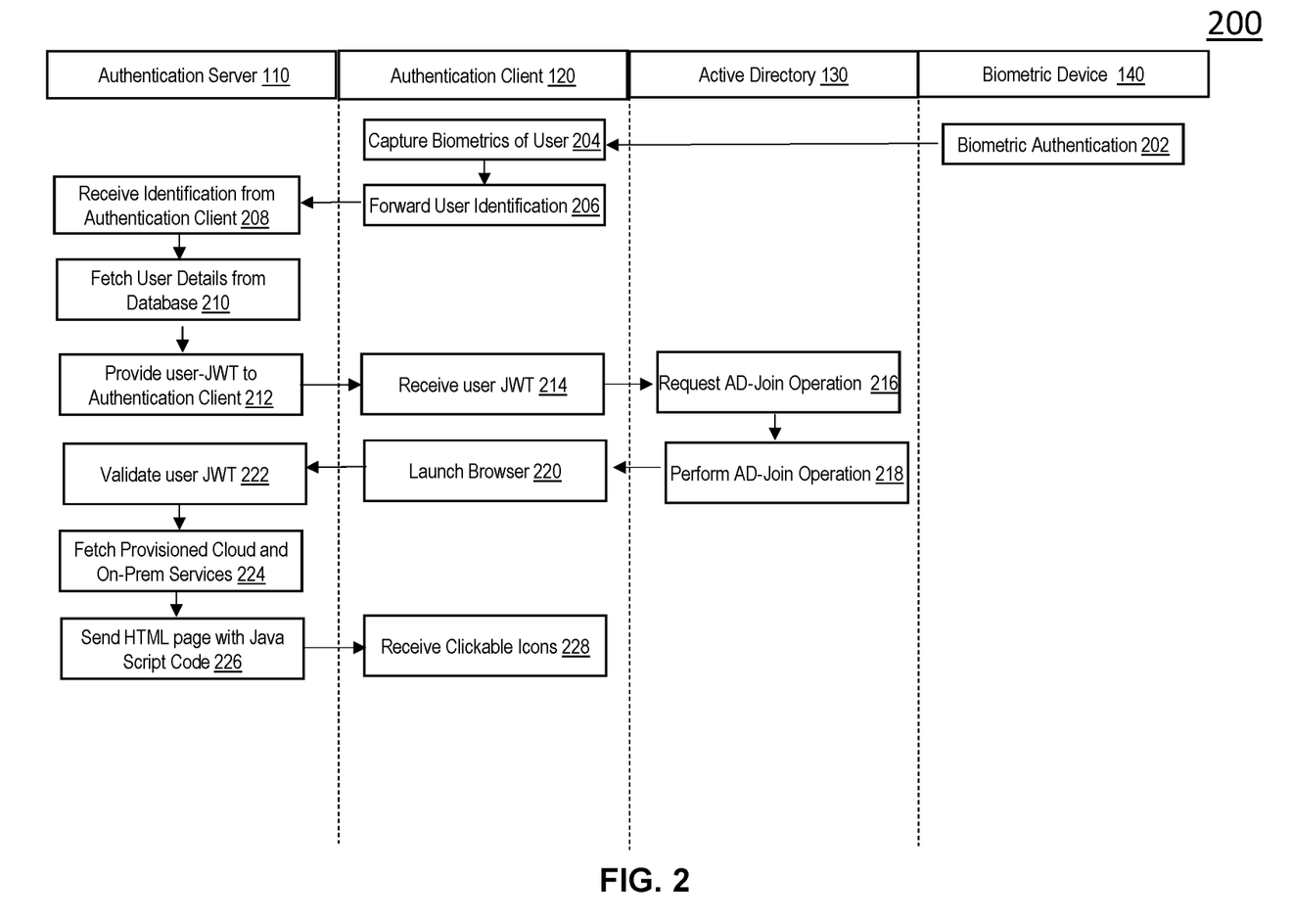
FIG. 2 is a flowchart illustrating a single sign-on workflow in accordance with an exemplary embodiment.

FIG. 2 is a flowchart 200 illustrating a single sign-on workflow in accordance with an exemplary embodiment. As shown in FIG. 2, in step 202, the user 150 is authenticated, for example, on a biometric device 140, 142, 144. In step 204, the biometrics of the user (i.e., user identification) 150 from the biometric device 140, 142, 144 is captured by the authentication client 120. In step 206, the authentication client 120 forwards the user identification received from the biometric device 140, 142, 144, to the authentication server 110. In step 208, the authentication server 110 receives the user identification from the authentication client 120 and in step 210, the authentication server 110 fetches (i.e., retrieves) details on the user 150 from a user database (User DB) 112. Upon successful authentication of the user 150, in step 212, the authentication server 110 provides a user Jason Web Token (user-JWT) for the user 150 to the authentication client 120 with a user principle name, active direction (AD) domain name, and user domain password. In step 214, the authentication client 120 receives and stores the user-JWT 106. In step 216, the authentication client 120 request an AD-join operation using the user principle name, AD domain name, and user domain password retrieved from the authentication server 110 with the active directory 130. In step 218, the active directory 130 performs the AD-join operation with the authentication client 120. In step 220, the authentication client 120 launches a browser that instantly talks to the authentication server 110 (i.e., https://<servers domain name>/../../captivecloud?userJWT=<userjwt>/). In a step 222, the authentication server 110 validates the user-JWT, and in step 224 fetches (retrieves) provisioned cloud and on-premises services for the authenticated user, for example, from a service database (Service DB) 114. In step 226, the authentication server 110 responds to the authentication client 120 with an HTML page that is constructed, for example, with Java Script code with clickable icons for each provisioned services. In step 228, the HTML page is then presented to the user 150, for example, via a graphical user interface on the authentication client 120 for use (i.e., service consumption) by the user(s) 150, and wherein the consumption is started when the user 150 initiates a mouse-click or hits a key.

Figure 3:
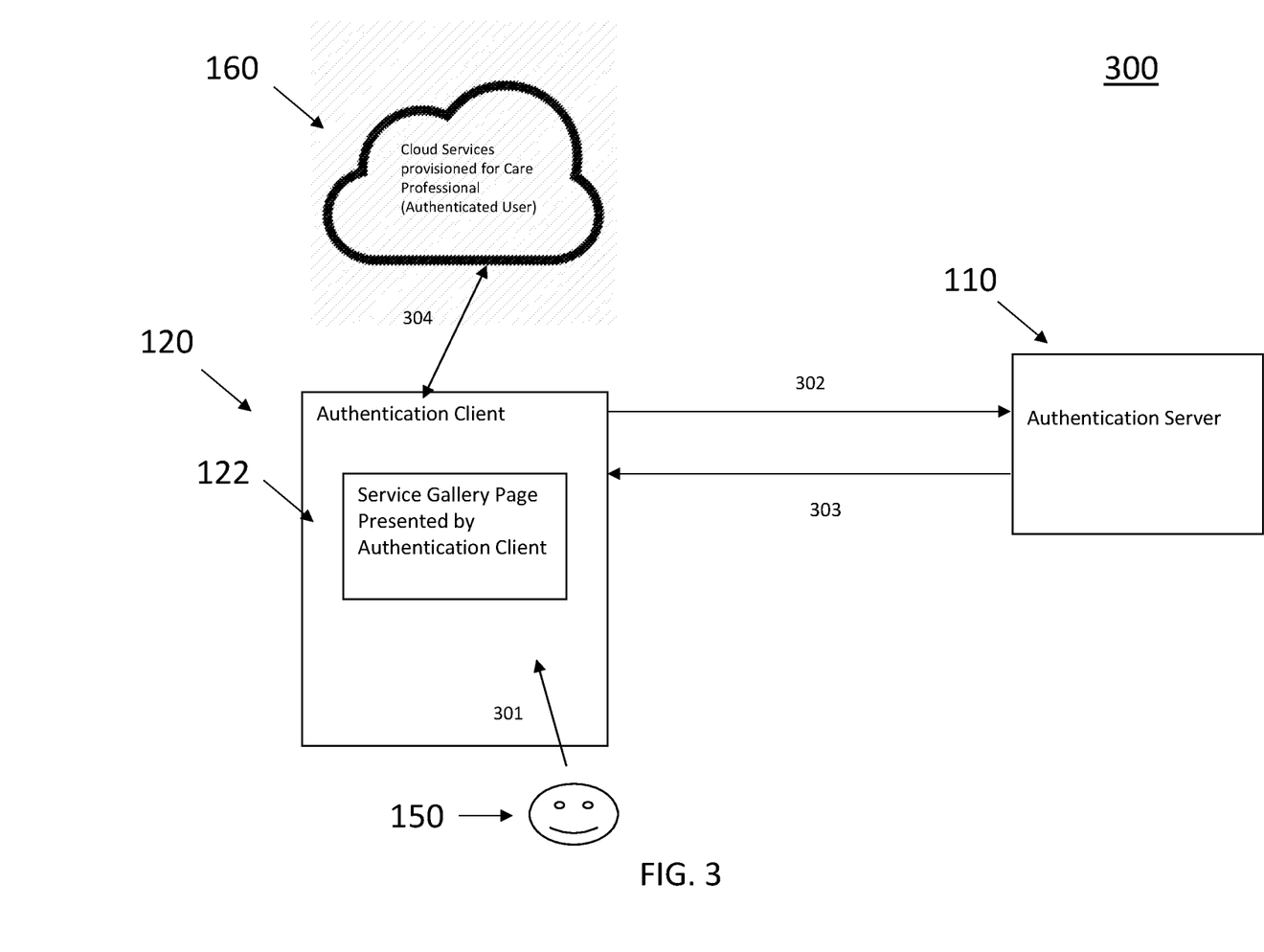
FIG. 3 is a diagram illustrating a system for single sign-on in accordance with an embodiment.

FIG. 3 is a diagram 300 illustrating a system for single sign-on in accordance with an embodiment. As shown in FIG. 3, once the user 150 has been authenticated in the processes as disclosed in FIGS. 1 and 2 by the authentication server 110 and presented with a server browser gallery page 122 on the authentication client 120 to the user 150. In step 301, the user can begin consuming (i.e., accessing) single sign-on services by touching (or clicking) on the icon image on the service gallery page 122 being presented to the user 150, which services are available immediately as soon as the user 150 has been biometrically authenticated without any mouse click or key-hit on a keyboard attached to the authentication client 120. In step 302, the browser page Java Script function talks to the authentication server 110, and provides the user-JWT and service name being accessed on the service gallery page. In step 303, the authentication server 303 performs user authentication using the user-JWT, produces a cookie and redirects the browser session to the intended cloud service. In step 304, a single sign-on flow can be initiated with the cloud service 160 and the authentication server 110 finishes the connection to provide the cloud service 160 to user 150. In accordance with an exemplary embodiment, the cloud service 160 can be any service offered, for example, by Google, Box, Salesforce, etc. In accordance with an exemplary embodiment, single sign-on with the cloud service 160 is a SAML single sign-on (i.e., Security Assertion Markup Language single sign-on) configured to exchange authentication and authorization data between parties, in particular, between an identity provider and a service provider.

In accordance with an exemplary embodiment, the software agent on the authentication client 120 holds the Jason Web Token (JWT) for the user 150, since the user 150 has already been biometrically authenticated through the authentication client 120 and the authentication server 110. The browser session can be instantly visible to the user 150 upon unlocking their workstation, for example, via password and PIN with a mouse or keyboard. The request can fetch, for example, an HTML5 page with JavaScript that has links and images (for example, a Google image icon, etc.) to all the provisioned cloud-based and on-premises based services for the user 150. Each of these services can be available, for example, by clicking on the image on a user interface of the workstation (i.e., authentication client 120). In accordance with an exemplary embodiment, at this point the browser page can include all services available, for example, for a healthcare-professional (i.e., user) in a gallery-fashion. In accordance with an exemplary embodiment, so far (to get to see the service gallery page), the user did not mouse-click or hit any key on keyboard such that an instant single sign-on services can be available with "no-click" and/or "no-hit".

In accordance with an exemplary embodiment, the health care profession (i.e., user 150), clicks any cloud service 'Google' icon, the software agent at the authentication client 120 internally and seamlessly talks with authentication server 110, performs user authentication using the stored user-JWT causing the authentication server 110 to produce a cookie. In accordance with an exemplary embodiment, the custom authentication server 110 redirects the browser session to the cloud service 160, for example, Google, and wherein the user 150 is presented with a suite of Google services instantly.

In accordance with an exemplary embodiment, the service gallery page 122 can include on-premises services as well. For on-premises security handling, when the user 150 clicks on any on-premises service on the parent service gallery page, a click handler function in Java Script function will open a connection to the windows server (i.e., destination machine serving the service or application) using, for example, an integrated windows authentication with available Kerberos Ticket (as work station is currently domain joined) via step 302. Each click (on the services at the service gallery 122) will open a new browser tab. In accordance with an exemplary embodiment, the original (parent) service gallery web page 122 when launched can also have a "Logout" button, which can be a SAML logout only. With the logout feature, the captive cloud experience can be applied to a shared-terminal or tablet with needed security.

Figure 4:
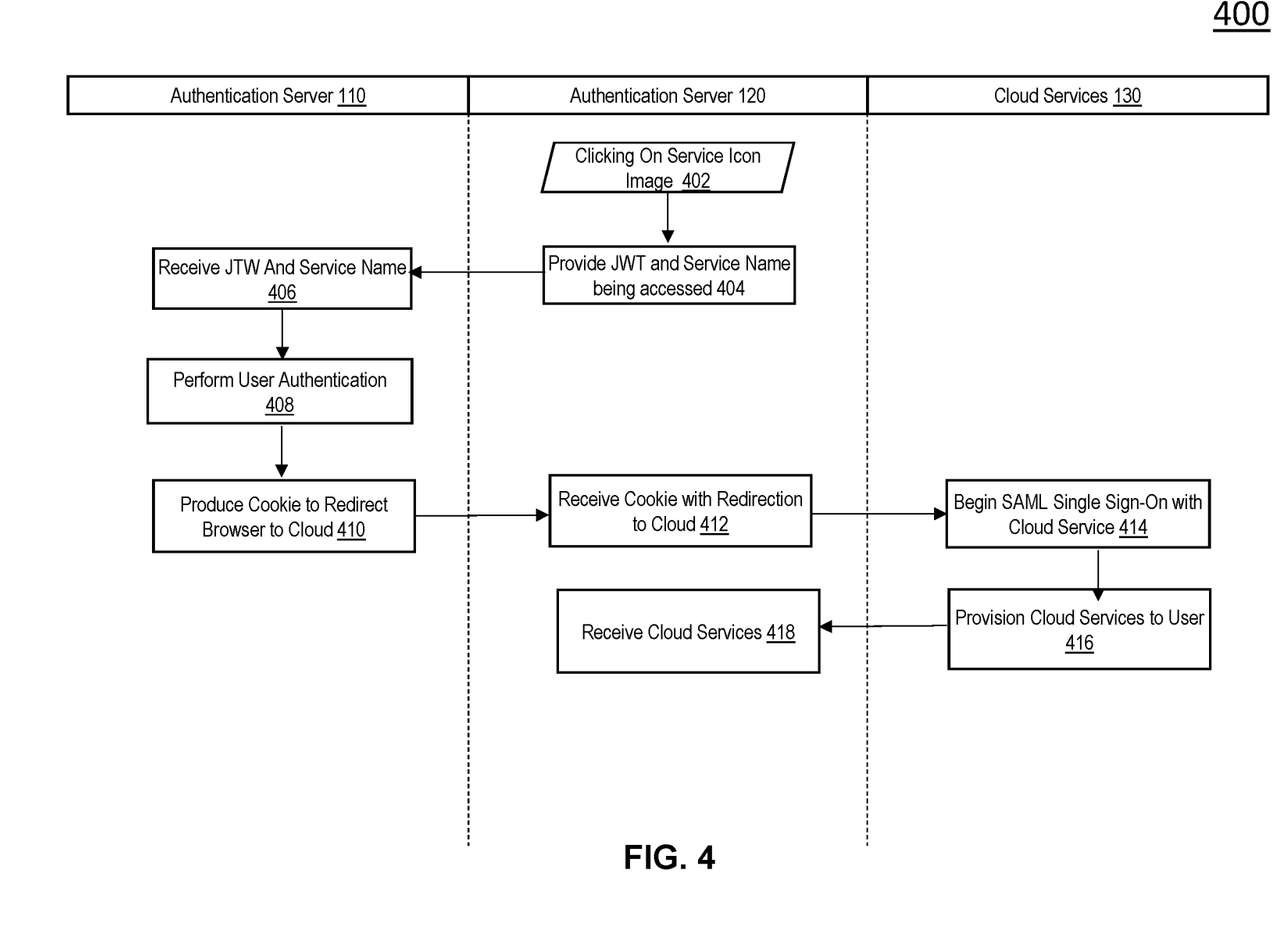
FIG. 4 is a flow chart illustrating a method for single sign-on after a user has been authorized in accordance with an embodiment.

FIG. 4 is a flow chart 400 illustrating a method for single sign-on after a user 150 has been authorized in accordance with an embodiment. As shown in FIG. 4, once the user 150 has been authorized, the user 150 will be presented with a service gallery page 122 on the authentication client 120. In step 402, the user 150 can click on a service icon image on the service gallery page 122. In step 404, the authentication client 120 will present the authentication server 110 with the user-JWT and service name in which access is being requested. In step 406, the authentication server 110 receives the user-JWT and service name. In step 408, the authentication server 110 performs user authentication by confirming that the user-JWT is same as the user-JWT produced in step 105 (FIG. 1) and step 212 (FIG. 2). In step 410, upon confirmation of the user 150 based on the user-JWT, the authentication server 110 produces a cookie, which is configured to redirect the browser in the authentication client 120 to the cloud service 130. In step 412, the authentication client 120 receives the cookie from the authentication server 110 and is redirected to the cloud service 130. In step 414, a single sign-on, for example, a SAML single sign-on is performed with the cloud service 130. In step 416, the cloud service 130 provisions cloud services to the authentication client 120. In step 418, the authentication client 120 accesses the services being provided by the cloud service 130.

In accordance with an exemplary embodiment, the authentication server 110 can be configured to handle authentication of authentication clients 120, which are mobile clients or mobile devices 120, for example, via the single sign-on (SSO) methods as disclosed. For example, as disclosed herein, the single sign-on methods can include any authentication process that allows a user to access multiple applications with one set of login credentials. Single sign-on, for example, is a common procedure in enterprises, where a user (or client) accesses multiple resources connected to a local area network (LAN). For example, the single sign-on can be performed as disclosed with the biometric device 140, 142, 144, which authenticates a user, for example, by fingerprint recognition, electrocardiogram (ECG or EKG), iris detection, and or other authentication protocols, which are currently implemented or will be implemented on mobile devices.

In accordance with an exemplary embodiment, as set forth, the single sign-on (SSO) method can include Security Assertion Markup Language (SAML), which is an XML standard for exchanging single sign-on (SSO) information between an SAML Federation Identity Provider (SAML-IdP) who asserts the user identity and a SAML Federation Service Provider (SAML-SP) who consumes the user identity information. SAMLv2.0 (Security Assertion Markup Language version 2) supports IDP-initiated and SP-initiated flows. In IdP-initiated SAML SSO flow, the SAML-IdP creates a SAML single sign-on assertion for the user identity, and sends the SAML single sign-on assertion to the SP (Service Provider) in an unsolicited fashion. In SP-Initiated SAML SSO flow, the SP generates a SAML2.0 AuthnRequest (i.e., Authentication Request) that is sent to the SAML-IdP as the first step in the Federation process and the SAML-IdP then responds with a SAML Response, both of these interactions being asynchronous to each other.

In accordance with an exemplary embodiment, the single sign-on (SSO) method can be OpenID Connect (OIDC), which is an identity layer on top of an OAuth 2.0 protocol, which allows computing clients to verify the identity of an end-user based on the authentication performed by an authorization server, as well as to obtain basic profile information about the end-user in an interoperable and REST-like manner. In technical terms, OpenID Connect specifies a RESTful (Representational State Transfer), HTTP (hypertext transfer protocol), and API (application program interface), using JSON (JavaScript Objection Notation) as a data format. OpenID Connect, for example, allows a range of clients, including Web-based, mobile, and JavaScript clients, to request and receive information about authenticated sessions and end-users. The specification suite can also support optional features such as encryption of identity data, discovery of OpenID Providers, and session management.

In accordance with an exemplary embodiment, the authentication server 110 can be an enterprise server that includes a directory component, which is configured, for example, to host a database of users and/or resource parameters, which can be executed, for example, on the authentication client 120 as disclosed herein. For example, the directory component can be an Active Directory (AD) server, or a lightweight directory access protocol (LDAP) server.

Figure 5:
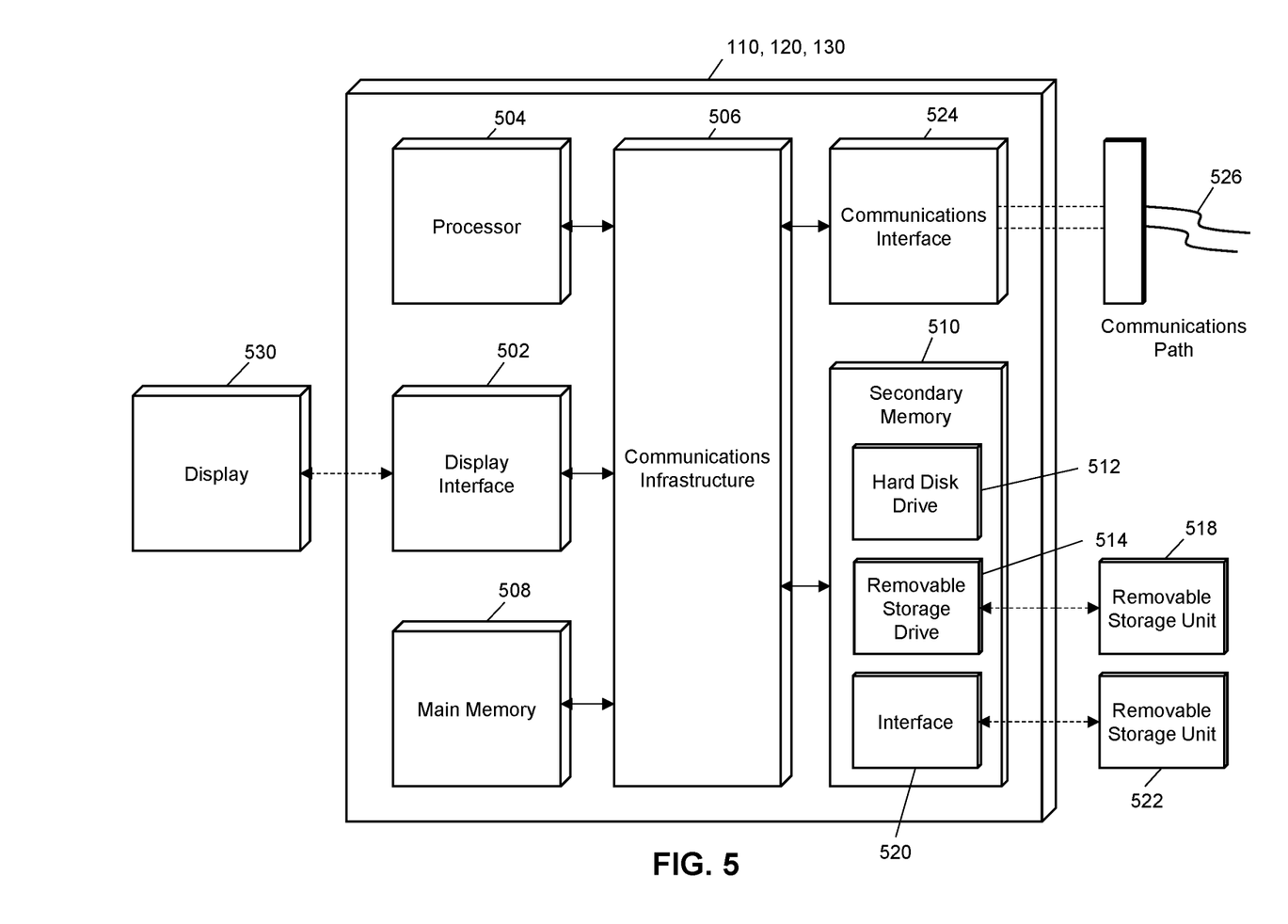
FIG. 5 is a block diagram illustrating an authentication server, an authentication client, or an active directory (i.e., computer system) computer system architecture in accordance with exemplary embodiments.

FIG. 5 illustrates an authentication server 110, an authentication client 120, or an active directory 130 (i.e., computer system) in which embodiments of the present disclosure, or portions thereof, may be implemented as computer-readable code. For example, the system and methods of FIGS. 1-4 may be implemented in the computer systems 110, 120, 130 using hardware, software, firmware, non-transitory computer readable media having instructions stored thereon, or a combination thereof and may be implemented in one or more computer systems or other processing systems. Hardware, software, or any combination thereof may embody modules and components used to implement the system and methods of FIGS. 1-4.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device (i.e., computer processor) as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 110, 120, 130. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device (or computer processor) 504 may be a special purpose or a general purpose processor device specifically configured to act as a special purpose computer to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (for example, WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 110 may also include a main memory 508 (for example, random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 110, 120, 130, for example, the removable storage unit 522 and an interface 520. Examples of such means may include a program cartridge and cartridge interface (for example, as found in video game systems), a removable memory chip (for example, EEPROM, PROM, etc.) and associated socket, and other removable storage units 522 and interfaces 520 as will be apparent to persons having skill in the relevant art.

Data stored in the computer system 110, 120, 130 (for example, in the main memory 508 and/or the secondary memory 510) may be stored on any type of suitable computer readable media, such as optical storage (for example, a compact disc, digital versatile disc, Blu-ray disc, etc.) or magnetic tape storage (for example, a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 110, 120, 130, may also include a communications interface 524. The communications interface 524 may be configured to allow software and data to be transferred between the biometric system 110 and external devices. Exemplary communications interfaces 524 may include a modem, a network interface (for example, an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 110, 120, 130 may further include a display interface 502. The display interface 502 may be configured to allow data to be transferred between the computer system 110, 120, 130 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 110, 120, 130, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (for example, DRAMs, etc.). These computer program products may be means for providing software to the computer system 110, 120, 130. Computer programs (for example, computer control logic) may be stored in the main memory 508 and/or the secondary memory 510. Computer programs may also be received via the communications interface 524. Such computer programs, when executed, may enable computer system 110, 120, 130 to implement the present methods as discussed herein. In particular, the computer programs, when executed, may enable processor device 504 to implement the system and methods illustrated by FIGS. 1-4, as discussed herein. Accordingly, such computer programs may represent controllers of the computer system 110, 120, 130. Where the present disclosure is implemented using software, the software may be stored in a computer program product and loaded into the computer system 110, 120, 130 using the removable storage drive 514, interface 520, and hard disk drive 512, or communications interface 524.

The processor device 504 may comprise one or more modules or engines configured to perform the functions of the computer system 110, 120, 130. Each of the modules or engines may be implemented using hardware and, in some instances, may also utilize software, such as corresponding to program code and/or programs stored in the main memory 508 or secondary memory 510. In such instances, program code may be compiled by the processor device 504 (for example, by a compiling module or engine) prior to execution by the hardware of the computer system 110, 120, 130. For example, the program code may be source code written in a programming language that is translated into a lower level language, such as assembly language or machine code, for execution by the processor device 504 and/or any additional hardware components of the computer system 110, 120, 130. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 110, 120, 130 to perform the functions disclosed herein. It will be apparent to persons having skill in the relevant art that such processes result in the computer system 110, 120, 130 being a specially configured computer system 110, 120, 130 uniquely programmed to perform the functions discussed above.

Figure 6:
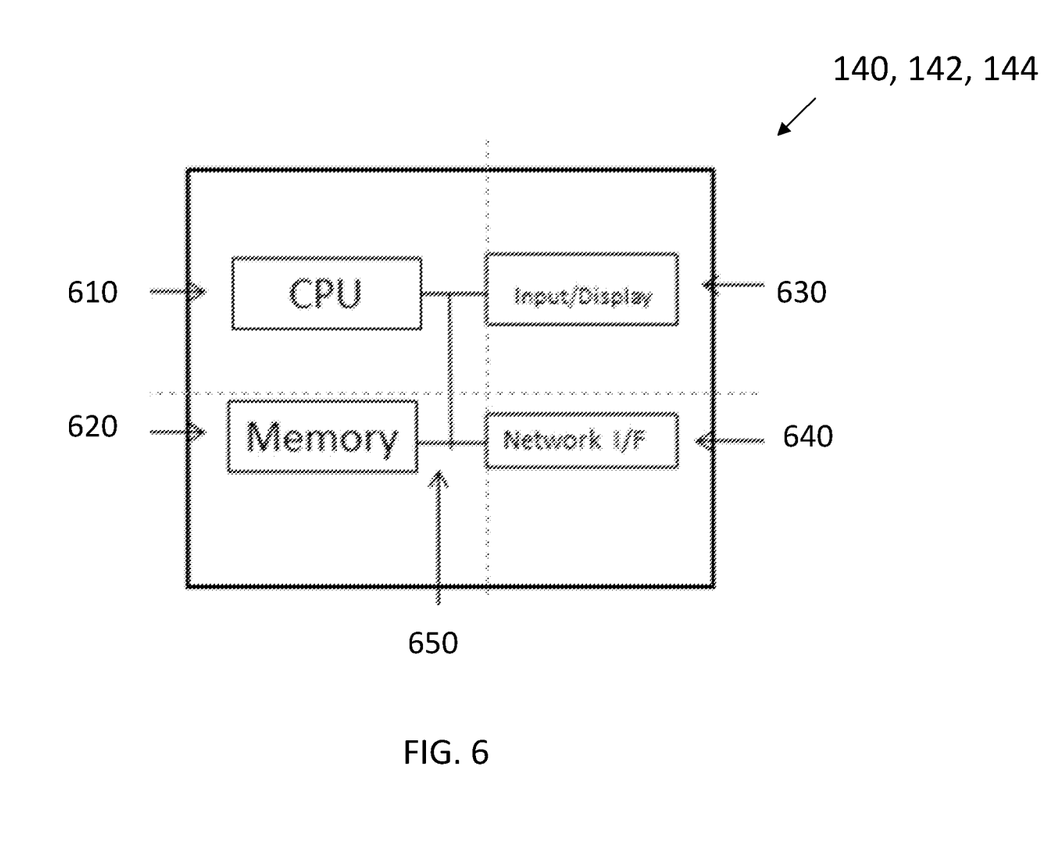
FIG. 6 is an illustration of a biometric device in accordance with an exemplary embodiment.

FIG. 6 is an illustration of a biometric device 140, 142, 144 in accordance with an exemplary embodiment. In accordance with an exemplary embodiment, the exemplary biometric device 140, 142, 144 is a security identification and authentication device, which uses automated methods of verifying or recognizing the identity of a living person based on a physiological or behavioral characteristic. The method of recognizing the user can include, for example, fingerprints, electrocardiogram (ECG or EKG) information, facial images, iris, and voice recognition. For example, in accordance with an exemplary embodiment, the biometric device 140, 142, 144 is a wearable device, for example, a Nymi™ band, which detection of the user is based on the electrocardiogram (ECG) and its unique properties, i.e., electrical activity of the heartbeat of the wearer.

As shown in FIG. 6, the biometric device 140, 142, 144 can include a processor or central processing unit (CPU) 610, and one or more memories 620 for storing software programs and data, for example, an operating system. In accordance with an exemplary embodiment, the processor or CPU 610 carries out the instructions of a computer program, which operates and/or controls at least a portion of the functionality of the biometric device 140, 142, 144. The biometric device 140, 142, 144 can also include an input unit and/or display unit or graphical user interface (GUI) 630, and a network interface (I/F) 640, which is configured to connect the biometric device 140, 142, 144 to the computer system 120 via, for example, a wire or wireless technology, for example, Bluetooth. A bus 650 can connect the various components 610, 620, 630, 640, within the biometric device 140, 142, 144.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present disclosure may be implemented such that its software part has been written onto a recording medium in advance and will be read as required in operation.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for a single sign-on for services, the method comprising:
   receiving, on a computer processor, user identification captured by a biometric device of a user;
   forwarding, by the computer processor, the user identification to an authentication server;
   receiving, on the computer processor, a user JavaScript Object Notation Web Token (user-JWT), user principle name, active directory domain name, and user domain name password, upon authentication of the user by the authentication server;
   performing, by the computer processor, an active directory join operation with an active directory using the user principle name, the active directory domain name, and the user domain name password;
   launching, on the computer processor, a browser that communicates with the authentication server; and
   receiving, on the computer processor, a Hypertext Markup Language page constructed with JavaScript code with clickable icons for provisioned services from the authentication server, the provisioned services being on-premises services and cloud services.

2. The method according to claim 1, comprising:
   receiving, on the computer processor, the on-premises services from an on-premises service server; and
   receiving, on the computer processor, the cloud services from a cloud server.

3. The method according to claim 1, wherein after the browser is launched on the authentication client, the method comprising:
   sending, by the computer processor, the user-JWT to the authentication server; and
   receiving, on the computer processor, the Hypertext Markup Language page with clickable icons after the authentication server validates the user-JWT received from the computer processor.

4. The method according to claim 3, comprising,
   fetching, by the authentication server, the provisioned on-premises services and the cloud services upon validating the user-JWT and corresponding user.

5. The method according to claim 1, wherein the authentication client includes a graphical user interface, the method comprising:
   starting, on the authentication client, consumption of the on premised services and the cloud services by a mouse click, a key stroke on a keyboard in connection with the authentication client, or touch of the graphical user interface.

6. The method according to claim 1, wherein the user identification captured by the biometric device is captured by touch or tap of the biometric device by the user.

7. The method according to claim 1, further comprising:
   receiving, by the computer processor, a click on one or more of the clickable icons for a cloud service of the provisioned services to generate a browser session;
   receiving, on the computer processor, a cookie from the authentication server, the cookie configured to redirect the browser session to a cloud service; and
   receiving, on the computer processor, the cloud service.

8. The method according to claim 7, comprising:
   establishing, by the computer processor, a Security Assertion Markup Language single sign-on flow between the authentication client and the cloud service.

9. The method according to claim 1, wherein the authentication client is a mobile client or a personal computer, the method further comprising:
   providing the provisioned services to the mobile client or the personal computer.

10. The method according to claim 1, wherein the biometric device is a wearable biometric device configured to measures electrical activity of a heartbeat of the user.

11. A non-transitory computer readable medium storing computer readable program code executed by a processor for a single sign-on for services, the process comprising:
    receiving user identification captured by a biometric device of a user;
    forwarding the user identification to an authentication server;
    receiving a user JavaScript Object Notation Web Token (user-JWT), user principle name, active directory domain name, and user domain name password, upon authentication of the user by the authentication server;
    performing an active directory join operation with an active directory using the user principle name, the active directory domain name, and the user domain name password;
    launching a browser that communicates with the authentication server; and
    receiving a Hypertext Markup Language page constructed with JavaScript code with clickable icons for provisioned services from the authentication server, the provisioned services being on-premises services and cloud services.

12. The non-transitory computer readable medium according to claim 11, comprising:
    receiving the on-premises services from an on-premises service server; and
    receiving the cloud services from a cloud server.

13. The non-transitory computer readable medium according to claim 11, wherein after the browser is launched on the authentication client, the process comprising:
    sending the user-JWT to the authentication server; and
    receiving the Hypertext Markup Language page with clickable icons after the authentication server validates the user-JWT received from the processor.

14. The non-transitory computer readable medium according to claim 13, comprising,
    fetching the provisioned on-premises services and the cloud services upon validating the user-JWT and corresponding user.

15. The non-transitory computer readable medium according to claim 11, wherein the authentication client includes a graphical user interface, the process comprising:
    starting consumption of the on premised services and the cloud services by a mouse click, a key stroke on a keyboard in connection with the authentication client, or touch of the graphical user interface.

16. The non-transitory computer readable medium according to claim 11, wherein the user identification captured by the biometric device is captured by touch or tap of the biometric device by the user, the process further comprising:
    receiving a click on one or more of the clickable icons for a cloud service of the provisioned services to generate a browser session;

receiving a cookie from the authentication server, the cookie configured to redirect the browser session to a cloud service;

establishing a Security Assertion Markup Language single sign-on flow between the authentication client and the cloud service; and receiving the cloud service.

17. A system for a single sign-on for services, the system comprising:

an authentication client having a processor, the processor configured to:

receive user identification captured by a biometric device of a user;

forward the user identification to an authentication server;

receive a user JavaScript Object Notation Web Token (user-JWT), user principle name, active directory domain name, and user domain name password, upon authentication of the user by the authentication server;

perform an active directory join operation with an active directory using the user principle name, the active directory domain name, and the user domain name password;

launch a browser that communicates with the authentication server; and receive a Hypertext Markup Language page constructed with JavaScript code with clickable icons for provisioned services from the authentication server, the provisioned services being on-premises services and cloud services.

18. The system according to claim 17, wherein the processor is configured to:

receive the on-premises services from an on-premises service server; and receive the cloud services from a cloud server.

19. The system according to claim 17, wherein after the browser is launched on the authentication client, the processor configured to:

send the user-JWT to the authentication server;

receive the Hypertext Markup Language page with clickable icons after the authentication server validates the user-JWT received from the processor, and wherein the authentication server is configured to fetch the provisioned on-premises services and the cloud services upon validating the user-JWT and corresponding user.

20. The system according to claim 17, wherein the authentication client includes a graphical user interface, the processor configured to:

start consumption of the on premised services and the cloud services by a mouse click, a key stroke on a keyboard in connection with the authentication client, or a touch of the graphical user interface; and wherein the user identification captured by the biometric device is captured by touch or tap of the biometric device by the user.

\* \* \* \* \*